L. COURSEN.
COMBINATION DISH WASHER AND CANNING DEVICE.
APPLICATION FILED JULY 24, 1918.
1,333,469.
Patented Mar. 9, 1920.
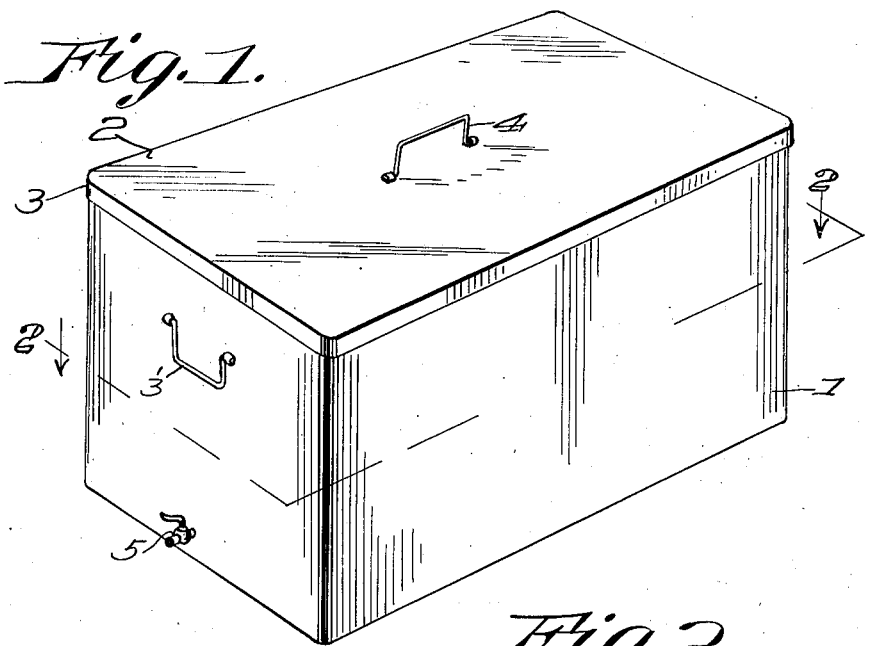
Fig. 1.
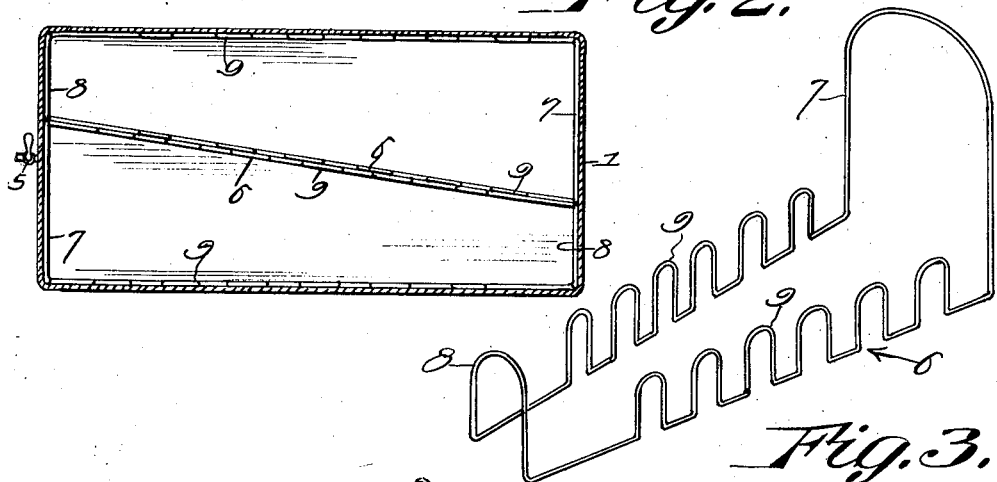
Fig. 2.
Fig. 3.
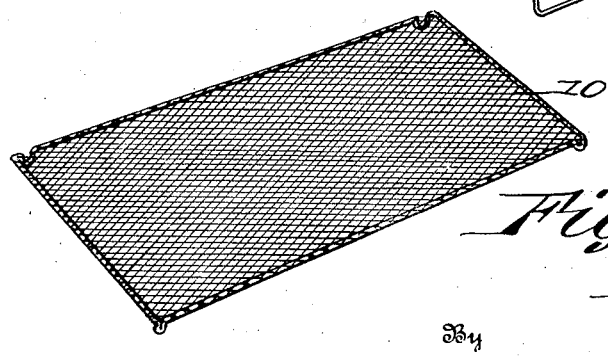
Fig. 4.
Inventor
Louise Coursen,
By
Attorney

UNITED STATES PATENT OFFICE.

LOUISE COURSEN, OF LEWISTON, ILLINOIS.

COMBINATION DISH-WASHER AND CANNING DEVICE.

1,333,469.  Specification of Letters Patent.  Patented Mar. 9, 1920.

Application filed July 24, 1918. Serial No. 246,581.

*To all whom it may concern:*

Be it known that I, LOUISE COURSEN, a citizen of the United States, residing at Lewiston, in the county of Fulton and State of Illinois, have invented new and useful Improvements in Combination Dish-Washers and Canning Devices, of which the following is a specification.

The invention is designed with the object in view of providing a device of this character which is exceedingly simple in construction, useful and effective in operation, and inexpensive to manufacture, the device consisting of a tank in which there is carried removable dish racks to permit dishes to be placed therein and scoured with scalding water.

While illustrated and described in the specific embodiment, the invention is not to be restricted to such. The right is reserved to vary the details of construction in any manner suggested by the demand of practice, provided such variations are compatible with the spirit of the annexed claim.

In the accompanying drawing:

Figure 1 is a perspective view of the tank,

Fig. 2 is a section on the line 2—2 of Fig. 1,

Fig. 3 is a perspective view of one of the dish racks,

Fig. 4 is a perspective view of a wire mat used in place of the trays when the device is used for canning purposes.

Referring to the drawings there is shown a tank 1 made preferably in the form of a rectangular parallelepiped, but having an open top on which there is carried a removable cover 2, the latter having the depending flanges 3 to assure its maintaining position on the tank. The tank on either end is provided with the handles 3' to permit its being carried and the cover 2 has a similar handle 4 to permit its being readily handled.

In one end of the tank and near the bottom thereof, there is attached a drain cock 5 which permits the release of water carried in the tank when it is desired to empty the latter. This makes unnecessary the inverting of the tank to empty it of any water which it may contain.

Arranged to set within the tank, there are dish racks 6. With the particular embodiment shown, two of these racks are employed and in plan they are made narrower at one end than at the other, so that the two racks when placed in the tank are in reverse positions as respects each other. Each rack is formed from a single piece of wire shaped to provide at its ends the transversely disposed U-shaped members 7 and 8, the U-shaped member 7 being at the wider end and the higher of the two members. Longitudinally, the wire is bent to form the upstanding U-shaped members 9 of which there is a series at each side of the rack, the individuals of each series being in spaced relation to each other, so that the said members on opposite sides of the frame will constitute means between which dishes may be carried and held in substantially upright position.

In the operation of the device, it is intended that dishes to be washed shall be scraped of all food stuffs and then stacked in the trays between the U-shaped members 9, the U-shaped members 7 and 8 of each tray constituting means for lowering the trays into the tank 1 after the dishes have been placed in the tray. The tank is then supplied with enough water to cover the dishes and this water should be of a very high temperature and can conveniently be so because of the fact that the hands are not to be brought into contact with it. The supplying of the tank with the water serves to cleanse the dishes carried in the trays and a mop may be used to loosen up any food stuffs that strongly adheres to any particular dish. The dishes having had all vestiges of food removed, the water may be drawn off by opening the pet cock 5. After this operation, the cleaning may be finished with a flushing of hot water poured over the dishes from a kettle or by means of a sink hose, and this water leaving by the pet cock permits the drying of the dishes from the heat left in them.

It will be observed that this is not only an easy method, but a very sanitary method of dish washing, and if the dishes do not dry as the result of the heat generated by the water after the latter has been drawn off, the final drying may be done by a towel and it is obvious that the one towel, under these circumstances will serve to dry a fairly great number of dishes.

When the device is to be used for canning purposes, the racks 6 are removed and in their place there is substituted the wire mat 10 which conforms to the plan dimensions of the tank and rests upon the bottom of the latter. This mat will serve to elevate the canning jars from the bottom of the tank.

From the foregoing description and the accompanying drawings, it is thought that the construction and operation of the invention has been made clearly apparent and further description is therefore unnecessary.

The invention having been described, what is claimed as new and useful is:

A device of the kind described consisting of a rack formed of a single piece of wire constituting an open frame wider at one end than at the other, the said frame being formed with transversely disposed U-shaped members at its ends, one of said members being higher than the other and disposed at the wider end of the frame, the intermediate portions of the frame being formed with upstanding U-shaped members, those on opposite sides of the frame being disposed opposite each other to provide pairs of said members between which dishes may sit and stand in substantially upward position for the purpose herein specified.

In testimony whereof I affix my signature.

LOUISE COURSEN.